(12) United States Patent
Lee et al.

(10) Patent No.: US 6,494,802 B2
(45) Date of Patent: Dec. 17, 2002

(54) HYDRAULIC CONTROL SYSTEM FOR AUTOMATIC TRANSMISSION

(75) Inventors: Chang-Wook Lee, Kyungki-do (KR); Jong-Sool Park, Kyungki-do (KR); Jae-Ho Cho, Kyungki-do (KR); Jae-Duk Jang, Kyungki-do (KR); Tae-Kyun Kim, Kyungki-do (KR); Jin-Hee Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/923,388

(22) Filed: Aug. 8, 2001

(65) Prior Publication Data

US 2002/0025874 A1 Feb. 28, 2002

(30) Foreign Application Priority Data

Aug. 23, 2000 (KR) .......................... 2000-48877

(51) Int. Cl.⁷ .............................. F16H 61/00
(52) U.S. Cl. ...................... 475/116; 475/127
(58) Field of Search ................. 475/116, 127

(56) References Cited

U.S. PATENT DOCUMENTS

| | | | | |
|---|---|---|---|---|
| 5,191,815 A | * | 3/1993 | Kouta | 475/116 |
| 5,902,204 A | * | 5/1999 | Takagi | 475/116 |
| 6,206,802 B1 | * | 3/2001 | Kim | 475/127 |

* cited by examiner

*Primary Examiner*—Sherry Estremsky
(74) *Attorney, Agent, or Firm*—Birch, Stewart, Kolasch & Birch, LLP

(57) ABSTRACT

A hydraulic control system for an automatic transmission includes a first clutch acting as an input element at first, second, and third forward speed ranges, a second clutch acting as the input element at third and fourth forward speed ranges, a third clutch acting as the input element at an R range, a fourth clutch operating at P, R, N, and L range for performing an engine brake function by stopping a one-way clutch at the first, second, and third forward speed ranges, a first brake acting as a response element at the P, R, N, and L ranges, a second brake acting as a response element at second and fourth forward speed ranges, a first switch valve for distributing hydraulic pressure controlled by a first solenoid valve to a damper clutch in a torque converter and to clutch control valves for the first clutch, and a second switch valve for distributing hydraulic pressure controlled by a second solenoid valve to the second clutch and the first brake.

4 Claims, 4 Drawing Sheets

FIG.2

Element operation table

| Range | C1 | C2 | C3 | C4 | B1 | B2 | F1 | F2 |
|---|---|---|---|---|---|---|---|---|
| P | | | | | | | | |
| R | | | ● | ● | ● | | | |
| N | | | | ● | ● | | | |
| D 1 | ● | | | ◎ | | | ● | ● |
| D 2 | ● | ● | | ◎ | | ● | | ● |
| D 3 | ● | ● | | ◎ | | ● | | ● |
| D 4 | ● | ● | | | | ● | | |
| L 1 | ● | | | ● | ● | | ● | ● |

HYDRAULIC CONTROL SYSTEM FOR AUTOMATIC TRANSMISSION

BACKGROUND OF THE INVENTION

1. Field of the Invention

The present invention relates to a hydraulic control system of an automotive automatic transmission.

2. Description of the Related Art

In an automatic transmission, gear shifting is generally performed in such a way that a transmission control unit TCU controls a plurality of solenoid valves for guiding hydraulic pressure so as to apply and release the pressure to and from specific friction elements, resulting in obtaining a target gear ratio in the transmission.

That is, if a shift lever is manipulated to indicate a target speed range, a manual valve in a hydraulic system responsively converts its ports to a corresponding speed range arrangement such that hydraulic pressure from an oil pump is distributed to expected hydraulic lines. The distributed pressure is selectively supplied to various friction elements via various valves under control of the TCU.

Thus, the shift performance of the automatic transmission is determined in accordance with how timely corresponding friction elements respond to the shift lever manipulation.

FIG. 4 shows a hydraulic circuit to be modified by adapting a hydraulic pressure control system of the present invention.

As shown in FIG. 4, hydraulic pressure generated by an oil pump 200 is regulated at a predetermined level by passing a regulator valve 202 and is then partially supplied to each friction element through a shift control part 204, and is partially supplied to a damper clutch control valve 208 via a torque converter control valve 206. Subsequently, the hydraulic pressure supplied to the damper clutch control valve 208 is fed as a damper clutch operation pressure in a torque converter TC and is partially fed as a control pressure to the shift control part 204 by being reduced via a reducing valve 210, or to the damper clutch control valve 208 under a control of a damper clutch control solenoid valve DCCSV.

The shift control part 204 comprises various solenoid valves, shift valves, a manual valve, and friction elements.

A forward clutch FWD/C of the shift control part 204 operates at all forward speed ranges using the hydraulic pressure fed from the manual valve 212 via a forward clutch control valve 214 under control of a forward clutch solenoid valve FCCSV, and a 3–4 clutch 3–4/C and a low-reverse brake LR/B operates respectively at forward 3 and 4 speed ranges and at P, R, N, and L ranges using the hydraulic pressure fed from the manual valve 212 via a 3–4/low-reverse control valve 216 which is controlled by control pressure of a 3–4/low-reverse solenoid valve LRSV and a 3–4/low-reverse timing valve 218 which is controlled by a L range pressure from the manual valve 212.

However, this conventional hydraulic pressure control system has a drawback in that there exist two separate solenoid valves for the damper clutch and the forward clutch so as to cause the hydraulic system and a control algorithm therein to be complicated.

Furthermore, the usage of the L range pressure as the control pressure for the 3–4/low-reverse timing valve causes a shift shock since hydraulic pressure is supplied to the low-reverse brake in a state where the pressure applied to the 3–4 clutch is completely released, when shifting the range from high speed of the D range to the L range.

SUMMARY OF THE INVENTION

The present invention has been made in an effort to solve the above problems.

It is an object of the present invention to provide a hydraulic control system of an automotive automatic transmission capable of preventing shift shocks during N–D and D–L range shift as well as simplifying a structure of the system.

To achieve the above object, a hydraulic control system of the present invention comprises a first clutch acting as an input element at first, second, and third forward speed ranges, a second clutch acting as the input element at third and fourth forward speed ranges, a third clutch acting as the input element at an R range, a fourth clutch operating at P, R, N, and L range for performing an engine brake function by stopping a one-way clutch at the first, second, and third forward speed ranges, a first brake acting as a response element at the P, R, N, and L ranges, a second brake acting as a response element at second and fourth forward speed ranges, a first switch valve for distributing hydraulic pressure controlled by a first solenoid valve to a damper clutch in a torque converter and to clutch control valves for the first clutch, and a second switch valve for distributing hydraulic pressure controlled by a second solenoid valve to the second clutch and the first brake.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is a table for illustrating operation of friction elements of the hydraulic control system according to a preferred embodiment of the present invention;

DETAILED DESCRIPTION OF THE PREFERRED EMBODIMENTS

Preferred embodiments of the present invention will now be described in detail with reference to the accompanying drawings.

Figure 1:
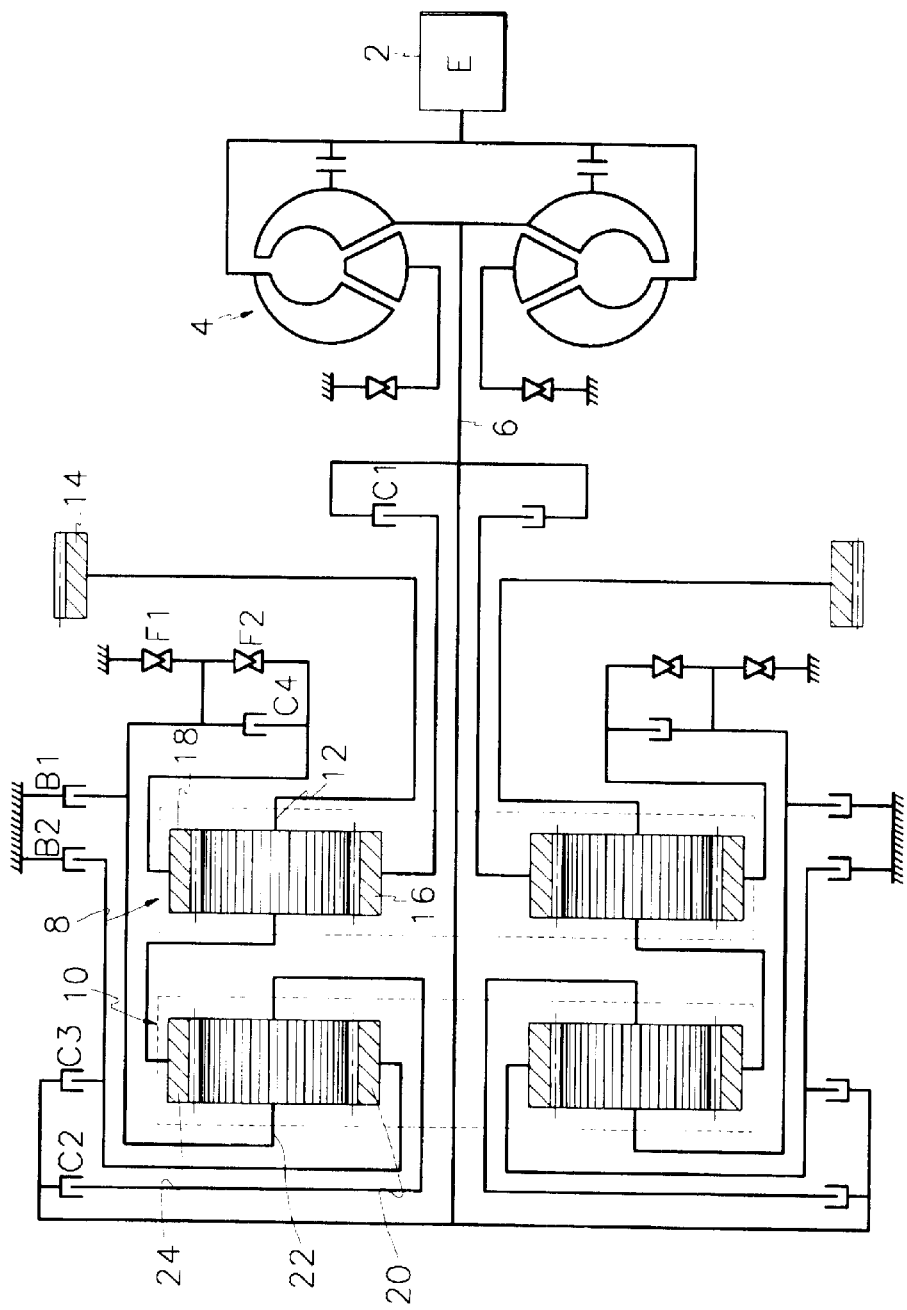
FIG. 1 is a view for illustrating a power train controlled by a hydraulic control system of the present invention.

FIG. 1 shows a power train adapted to a hydraulic control system of the present invention.

In FIG. 1, the power train can obtain 4 forward speed ranges and 1 reverse range using 2 single pinion planetary gear sets.

Engine torque is transferred from the engine 2 to first and second single pinion planetary gear sets 8 and 10 through a torque converter 4 and an input shaft 6 such that the torque is output through a transfer drive gear 14 via a planetary gear 12 of the first single pinion planetary gear set 8. During this transfer, the first and second single pinion planetary gear sets 8 and 10 are coordinated with each other such that operation and friction elements thereof are linked to achieve a target gear ratio.

The first single pinion planetary gear set 8 comprises a first sun gear 16, a first planetary carrier 12, and a first ring gear, and the second single pinion planetary gear set 10 comprises a second sun gear 20, a second planetary carrier 22, and a second ring gear 24.

As shown in FIG. 1, the first planetary carrier 12 is fixedly connected to is the second ring gear 24 and the first sun gear is selectively connected to the input shaft 6 using a first clutch C1 which operates at all the forward speed ranges.

The second planetary carrier 22 is connected to the input shaft 6 by interposing a second clutch C2 that operates at forward 3 and 4 speeds, and the second sun gear 20 is connected to the input shaft 6 by interposing a third clutch C3 that operates at reverse range.

Also, the second planetary carrier 22 is connected to a transmission housing 26 by interposing a first brake B1 and a first one-way clutch F1 in parallel, and at the same time the second planetary carrier 22 is connected to the first ring gear 18 by interposing a fourth clutch C4 and a second one-way clutch F2 in parallel.

The second sun gear 20 is connected to the transmission housing by interposing a second brake B2.

FIG. 2 is a table for illustrating operation of the friction elements of the above-structured power train.

At a first forward speed range, the first clutch C1 and the first and second one-way clutches F1 and F2 operate such that the first sun gear 16 acts as an input element and the first ring gear 18 and the second planetary carrier 22 acts as a response element.

At a second forward speed range, the second brake B2 operates from the first forward speed state such that the first sun gear 16 acts as the input element and the second sun gear 20 acts as the response element.

At a third forward speed range, the second clutch C2 operates from the second forward speed state and the second brake B2 is released such that the first and second single pinion planetary gear sets 8 and 10 are locked. As a result, the output torque is synchronized with the input torque.

At a fourth forward speed range, the second brake B2 operates from the third forward speed range such that the second sun gear 20 acts as the response element, resulting in an overdrive state.

At a reverse range, the third clutch C3 and the first brake B1 operate such that the second sun gear 20 acts as the input element and the second planetary carrier 22 acts as the response element.

That is, the first clutch C1 is engaged at the first, second, and third forward speed ranges; the second clutch C2 is engaged at the third and fourth forward speed ranges; the third clutch C3 is engaged at the reverse range R; the fourth clutch C4 is engaged at the ranges "P", "R", "N", and "L"; the first brake B1 is engaged at the ranges "P", "R", "N", and "L"; and the second brake B2 is engaged at the second and fourth forward speed ranges.

Figure 3:
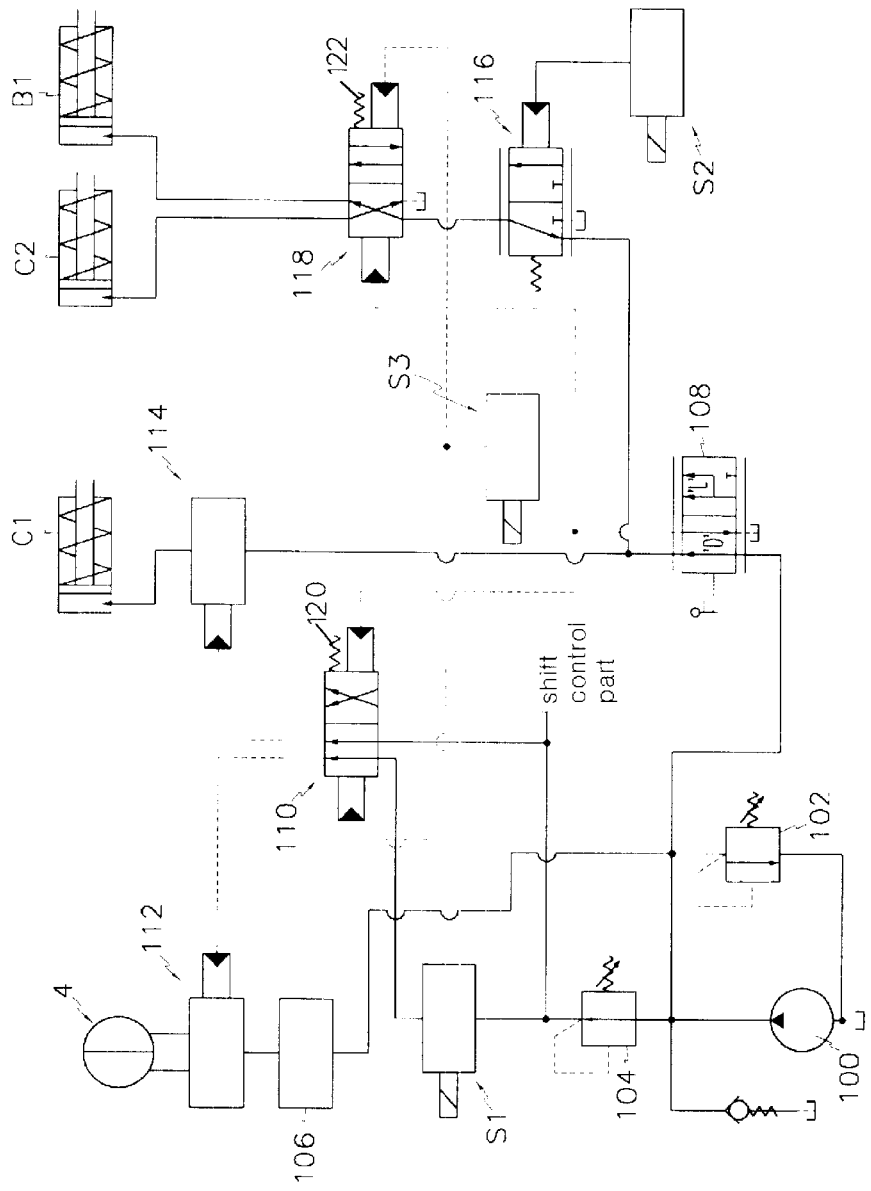
FIG. 3 is a partial hydraulic circuit for illustrating the hydraulic control system according to the preferred embodiment of the present invention.
Figure 4:
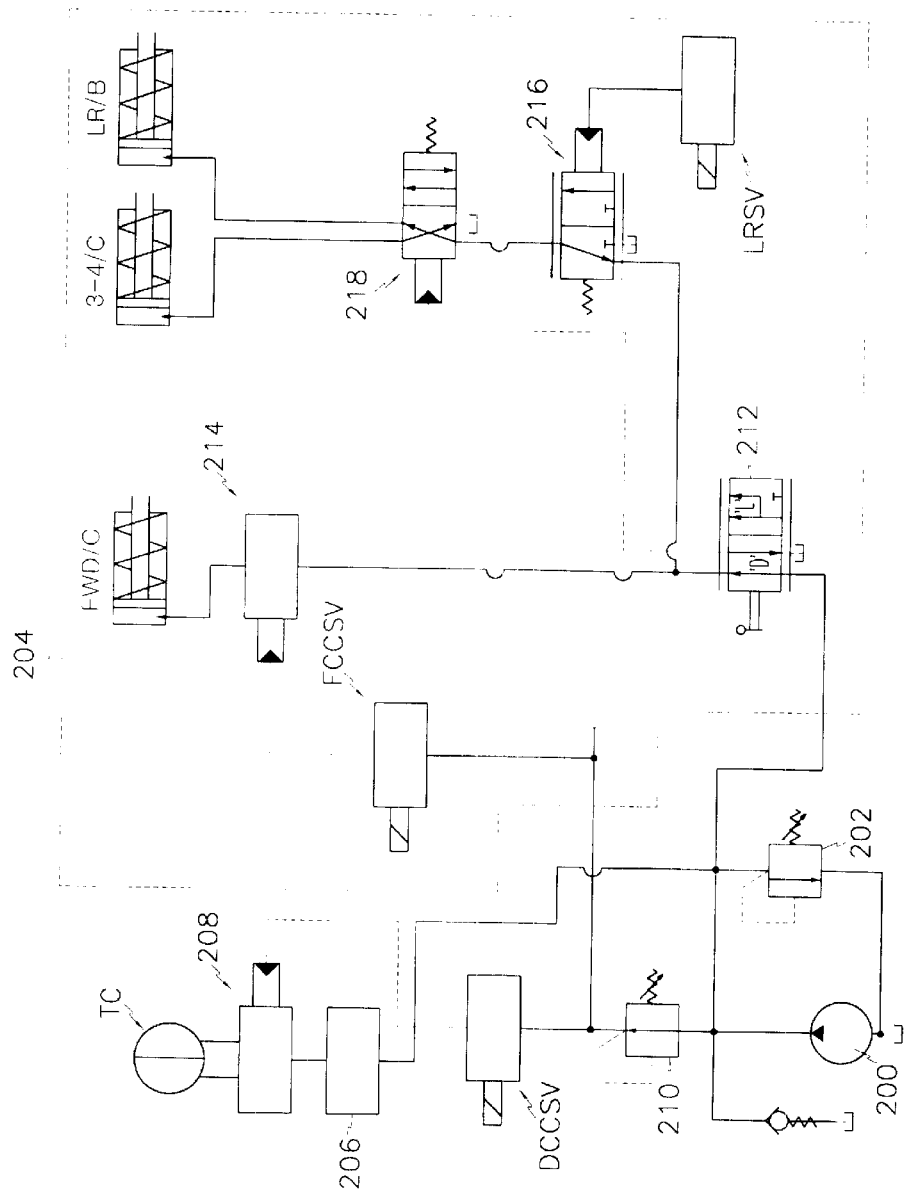
FIG. 4 is a conventional hydraulic circuit.

In FIG. 3, once an engine 2 starts, an oil pump 100 generates hydraulic pressure and sends the same to a regulator valve 102. The hydraulic pressure is regulated to a predetermined level by the regulator valve 102 and then distributed to a reducing valve 104, a torque converter control valve 106, and a manual valve 108.

The hydraulic pressure distributed to the reducing valve 104 is reduced so as to be partially fed to a damper clutch control valve 112 and a first control valve 114 as control pressures thereof via a first switch valve 110 under control of a first solenoid valve S1, and it is partially fed to solenoid valves arranged in a transmission control part for controlling the solenoid valves.

The hydraulic pressure distributed to the torque converter control valve 106 is fed to a damper clutch control valve 112 so as to be used as a damper clutch control pressure in the torque converter 4.

The hydraulic pressure distributed to the manual valve 108 is fed to the first and second control valves 114 and 116 at the D range such that the second control valve 116 selectively supplies the pressure to the second clutch C2 and the first brake B1 according to the second solenoid valve S2.

Particularly at an L range, the first and second switch valves 110 and 118 are fed by first control pressures that are parts of line pressure of the D range, and fed by second control pressures under an On/Off control of the third solenoid valve S3.

The first switch valve 110 is provided with an elastic member 120 at an opposite side of the side to which the control pressure is applied from the third solenoid valve S3, and the second switch valve 118 is provided with an elastic member at a side to which the control pressure is applied from the third solenoid valve S3.

Therefore, as for the second switch valve 118, when a control pressure is not generated by the third solenoid valve S3, port conversion occurs according to whether the L range pressure is applied to the other side, that to which the elastic member 122 is not disposed. Further, as for the first switch valve 110, when the L range pressure is not applied to the side to which the elastic member 120 is disposed, port conversion occurs according to whether a control pressure is applied from the third solenoid valve S3.

That is, the first switch valve 110 for selectively switching pressure lines to the damper clutch (not shown) and the first clutch C1 which operates at the first, second, and third forward speed ranges, and the second switch valve 118 for selectively switching pressure lines to the second clutch C2 which operates at the third and fourth forward speed ranges, as well as the first brake B1 which operates at P, R, N, and L ranges are controlled by the second control pressure of the third solenoid valve S3 and L range pressure.

The operation of the above-structured hydraulic control system according to the present invention will be described hereinbelow.

P, R, N Ranges

At the P, R, and N ranges, the first switch valve 110 is applied only by the second control pressures from the third solenoid valve S3 because the manual valve 108 does not generate L range line pressure.

That is, even though the third solenoid valve S3 is on at the P, R, and N ranges so as to supply the control pressure of the first solenoid valve S1 to the first control valve 114, the first clutch C1 does not operate because the manual vale 108 does not feed the line pressures to the first control valve 114.

In this case, the hydraulic pressure reduced by the reducing valve 104 is fed to the damper clutch control valve 112 as a clutch control valve control pressure via the first switch valve 110 so as to cause hydraulic pressure from the torque converter control valve 106 to be used as a damper clutch relief pressure.

At the same time, the second switch valve 118 switches its ports so as to communicate the second control valve 116 with the second clutch C2 and to release pressure from the second brake B1. However, the second clutch C2 does not operate because the manual valve 108 does not feed the line pressures thereto.

N-D Manual Shift

Since the first solenoid valve S1 is supplying the line pressure to the first switch valve 110 at the N range, the first clutch C1 can be immediately controlled.

Accordingly, an N–D manual shift can be performed by adjusting the line pressure to the first clutch C1 under control of the first solenoid valve S1.

Also, since the second switch valve 118 communicates with the second clutch C2 at the N range, the second switch valve 118 is controlled so as to not generate line pressure by controlling the second solenoid valve S2.

D Range

Since L range pressure is not generated at D range, the second switch valve 118 does not operate while the first switch valve 110 is controlled by the third solenoid valve S3.

The third solenoid valve S3 is OFF so as to prepare for controlling the damper clutch after the N–D shift such that the first switch valve 110 is controlled so as to supply the reduced pressure to the first control valve 114, resulting in supplying line pressure to the first clutch C1, and the first solenoid valve S1 supplies control pressure to the damper clutch control valve 112 such that the damper clutch DC can be controlled.

The second switch valve 118 maintains the previous state such that the second brake B1 is connected to an exhaust port and the second control valve 116 is connected to the second clutch C2 at its downstream port such that the second clutch C2 is operated at the third and fourth forward speed ranges.

D–L Shift

When the speed range shifts from a high speed range such as third or fourth forward speed range to the L range, the L range pressure is supplied to the second switch valve 118. However, the hydraulic circuit is maintained at its present state until the third solenoid valve S3 is turned on such that the second clutch C2 operates so as to perform a down-shift. And then, if the third solenoid valve S3 is turned on at that time for operating the first brake B1, the second switch valve 118 switches ports so as to exhaust the pressure from the second clutch C2, and to supply the line pressure from the second control valve 116 to the first brake B1.

In this case, the first switch valve 110 switches ports such that the reduced pressure is supplied to the damper clutch control valve 112 so as to release the damper clutch, and the pressure from the first solenoid valve S1 is supplied to the first control valve 114 so as to be able to control the first clutch C1.

L Range

The first switch valve 110 comes into the state where a neutral control is possible regardless of the On/Off control of the third solenoid valve S3 and releases the damper clutch.

The second switch valve 118 switches the ports so as to redirect the pressure from the second control valve 116 according to the third solenoid valve S3 such that the second brake B1 can be controlled.

L–D Shift

In the L–D shift, port switching of the second switch valve 118 has no effect on the hydraulic control because a pressure relief of a second brake does not generate a shift shock even though there is no control.

In this case, since the pressure must not be supplied to the second clutch C2 via the second control valve 116 at the same time the port switching of the second switch valve 118 occurs, the second solenoid valve S2 must be controlled during shift operation so as to release the pressure.

Previous to the L–D shift, the speed range is the first forward speed range, and the third solenoid valve is on such that the first switch valve 110 maintains the left side port in an open state if the L range pressure is released. The third solenoid valve S3 is then controlled for a predetermined time for controlling the damper clutch.

As described above, the hydraulic control system of the present invention uses the hydraulic pressure from the first solenoid valve as a switch valve control pressure for controlling the first clutch at the first forward speed range and as a damper clutch control pressure over the second forward speed range so as to prevent the second clutch, which operates at the third and fourth forward speed ranges, and the first brake which operates at the L range, from working at the same time so as to prevent shift shocks from being generated during the N–D and D–L shifts.

Also, this hydraulic control system can reduce manufacturing costs and simplify the hydraulic circuit structure since just one solenoid valve is used for controlling two switch valves.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hydraulic control system for an automatic transmission, comprising:

a first clutch acting as an input element at first, second, and third forward speed ranges;

a second clutch acting as the input element at third and fourth forward speed ranges;

a third clutch acting as the input element at an R range;

a fourth clutch operating at P, R, N, and L range for performing an engine brake function by stopping a one-way clutch at the first, second, and third forward speed ranges;

a first brake acting as a response element at the P, R, N, and L ranges;

a second brake acting as a response element at second and fourth forward speed ranges;

a first switch valve for distributing hydraulic pressure controlled by a first solenoid valve to a damper clutch in a torque converter and to clutch control valves for the first clutch; and a second switch valve for distributing hydraulic pressure controlled by a second solenoid valve to the second clutch and the first brake.

2. A hydraulic control system of claim 1 wherein hydraulic line conversion is performed by control pressures of the first and second solenoid valves and L range pressure.

3. A hydraulic control system of claim 1 wherein the first switch valve is connected to a reducing valve and a solenoid valve which control output line pressure of the reducing valve at the input side thereof.

4. A hydraulic control system of claim 1, wherein the second switch valve is provided with an elastic member at a side to which a control pressure is applied from the solenoid valve.

* * * * *